United States Patent
Chambers et al.

(10) Patent No.: US 7,407,032 B1
(45) Date of Patent: Aug. 5, 2008

(54) PRACTICAL AND ENTERTAINING RECREATIONAL VEHICLE

(75) Inventors: Gary C. Chambers, Burdett, NY (US); Chance A. Chambers, Burdett, NY (US)

(73) Assignee: GCC Innovations, LLC, Hector, NY (US)

( * ) Notice: Subject to any disclaimer, the term of this patent is extended or adjusted under 35 U.S.C. 154(b) by 0 days.

(21) Appl. No.: 11/342,141

(22) Filed: Jan. 26, 2006

Related U.S. Application Data

(63) Continuation of application No. 10/278,652, filed on Oct. 23, 2002, now Pat. No. 7,055,642.

(51) Int. Cl.
*B62D 21/00* (2006.01)

(52) U.S. Cl. ............... 180/312; 180/313; 180/908; 280/87.043

(58) Field of Classification Search ............ 180/12, 180/14.1, 312, 313, 291, 908; 280/400, 87.043, 280/47.34, 87.01, 30; 224/401, 415, 275; 62/457.7

See application file for complete search history.

(56) References Cited

U.S. PATENT DOCUMENTS

| | | | | |
|---|---|---|---|---|
| 2,225,914 A | * | 12/1940 | Lewis et al. | 180/219 |
| 2,686,571 A | * | 8/1954 | Horste | 180/342 |
| 3,314,494 A | * | 4/1967 | Weitzner | 180/208 |
| 3,374,000 A | * | 3/1968 | Wetzel | 280/8 |
| 4,451,053 A | * | 5/1984 | Alioa et al. | 280/47.26 |
| 4,913,252 A | * | 4/1990 | Bartley et al. | 180/208 |
| 5,076,405 A | * | 12/1991 | Modica | 190/1 |
| 5,259,215 A | * | 11/1993 | Rocca | 62/371 |
| 5,316,096 A | * | 5/1994 | Good | 180/19.1 |
| 5,373,708 A | * | 12/1994 | Dumoulin, Jr. | 62/457.7 |
| 5,407,218 A | * | 4/1995 | Jackson | 280/30 |
| D358,921 S | * | 5/1995 | Abbema | D34/26 |
| 5,465,996 A | * | 11/1995 | Wisz | 280/651 |
| 5,513,868 A | * | 5/1996 | Barr | 280/400 |
| 5,913,378 A | * | 6/1999 | Brister et al. | 180/292 |
| 6,076,298 A | * | 6/2000 | Teel | 43/54.1 |
| 6,193,247 B1 | * | 2/2001 | Spear et al. | 280/33.998 |
| 6,318,740 B1 | * | 11/2001 | Nappo | 280/87.01 |

(Continued)

OTHER PUBLICATIONS

Jennifer Kingsley—Star Gazette Newspaper Aug. 11, 2002 (1) Page From Website Article—star-gazette.com.

*Primary Examiner*—Christopher Ellis
*Assistant Examiner*—Vaughn T Coolman
(74) *Attorney, Agent, or Firm*—Brown & Michaels PC

(57) ABSTRACT

The present invention provides for a practical and entertaining form of recreational transportation, easily transportable to weekend events. It is a compact transport kart (10), designed to carry at least one human passenger. It also transports its passenger across open road, or off-road terrain. The transport kart provides advantages and benefits over the prior art through use of a most unique type of body element (20), comprising of, or substantially resembling, a common icechest or common cooler. The body element can be selected of sufficient size and shape to also carry additional passengers, plus can be configured to carry ice and refreshments. The transport kart includes a power source (23) for propulsion, plus a set of wheels (21) and (22) mounted for rotation. A rotational output from the power source is drivingly connected to at least one of those wheels, therefore providing for a most unique and entertaining form of transportation.

18 Claims, 6 Drawing Sheets

U.S. PATENT DOCUMENTS

| | | | |
|---|---|---|---|
| 6,497,424 B2 * | 12/2002 | Gartner et al. | 280/47.4 |
| 6,502,656 B2 * | 1/2003 | Weiss et al. | 180/168 |
| 6,550,791 B2 * | 4/2003 | Ramsey | 280/47.19 |
| 6,631,925 B1 * | 10/2003 | Lawson, Jr. | 280/781 |
| 6,783,147 B1 * | 8/2004 | Green, Sr. | 280/652 |
| 6,993,931 B1 * | 2/2006 | Hamilton | 62/457.7 |
| D516,869 S * | 3/2006 | Beal | D7/605 |
| 7,055,642 B1 * | 6/2006 | Chambers et al. | 180/312 |
| 2002/0017411 A1 | 2/2002 | Weiss et al. | |
| 2002/0079146 A1 * | 6/2002 | Chen | |
| 2002/0125668 A1 * | 9/2002 | Sims | 280/47.26 |
| 2006/0048534 A1 * | 3/2006 | Beal | |

* cited by examiner

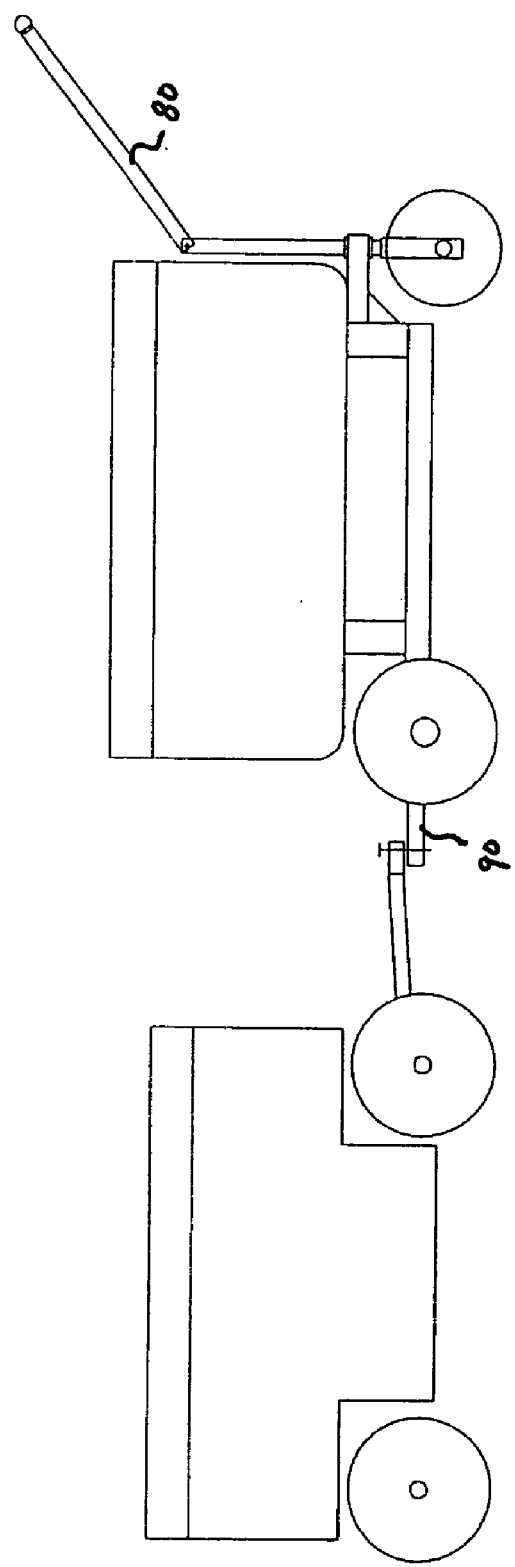

PRACTICAL AND ENTERTAINING RECREATIONAL VEHICLE

CROSS-REFERENCED TO RELATED APPLICATION

This is a Continuation of application Ser. No. 10/278,652, filed Oct. 23, 2002 now U.S. Pat. No. 7,055,642, the Specification of which is hereby incorporated by reference.

FIELD OF INVENTION

The invention generally relates to transportation vehicles, more particularly to a recreational type transport vehicle, which is compact in design, and capable of transporting at least one human passenger in a most practical and entertaining manner.

BACKGROUND OF THE INVENTION

1. Discussion of Problem

It happens far too often when one wishes they could pull out some type of compact transport device from the back of their vehicle, to carry them to their final destination. This might occur when one arrives at a weekend event and then realizes that they must then walk a significant distance to actually reach the site of that event. Some events can be so large, that the walk from the parking lot to the event, is nearly a mile. Still other events can require miles of walking, just to see all the attractions.

Having to walk long distances to get to ones event is unacceptable. Having to walk long distances within an event is unacceptable. To make matters worse, one might have also wished to bring some refreshments along, and must now struggle to carry a heavy cooler over that long trek, or worse yet, have to leave those refreshments behind.

This is only one example of when someone might wish for some type of compact transport device. The problem at hand is a lack of such a device, one which is compact and light enough to be easily loaded to take to an event, yet be up to the task of transporting one or more passengers across various terrain. It would also be desirable if that device could be capable of carrying ones ice and refreshments as well.

2. Discussion of Prior art

There are many known recreational type vehicles that could certainly provide for ones weekend transportation. One could additionally carry an ice-chest or cooler onboard, to carry ones refreshments.

All these devices however were designed for other tasks, making them larger, heavier, and more awkward than actually needed for the task at hand. This prevents one from being able to easily transport such a device to a weekend event. In addition, some have limitations in performing the task required, and some are just too expensive to justify.

An example of one such transport vehicle might be a golfcart. It could certainly be used to transport oneself, and one could certainly carry a cooler onboard. Hauling a golfcart however is no simple chore. Golfcarts are quite large and very heavy, requiring a large truck or trailer to transport them. In addition, they are limited to use on only open road, or gentle off-road terrain. If one could indeed transport a golfcart, one would quickly realize that it requires a substantial amount of room to operate and maneuver. This would certainly be a problem when attending a crowded event. The extra room needed to maneuver also limits its use off-road, especially in wooded areas, such as parks and campgrounds. A 4-wheel ATV might be used instead, which is better suited for both rougher terrain, and tighter conditions. These again are heavy, plus complex, therefore expensive machines, and again require a truck or trailer to transport them. One would also need to securely strap a cooler somewhere onboard for adequate carrying of ones refreshments. Yet another alternative might be to use a go-kart type vehicle, with some type of mounting means to securely carry the cooler. Go-karts once again require a truck or trailer to haul them, and also require a substantial amount of room to operate and maneuver because of their wide stance. In addition, most go-karts ride low to the ground, which limits their off-road use as well. Yet even another option might be a scooter or motorcycle, or other two-wheeled device. A framework or bracketry would again be required to carry a cooler full of ones refreshments. The cooler however would have to be quite limited in size because of its high mounting position along with the need to maintain proper balance while operating such two-wheeled devices. This is especially important when there is some quantity of water mixed with ones ice and refreshments sloshing around within the cooler. This limits their off-road usefulness as well.

In addition to all the above, if one utilizes any of the prior art, one would certainly be denied entry into events that prohibit motorized transit.

Accordingly, some of the shortcomings and disadvantages of using such prior art include:

the heavy weight of these devices, their large physical size, the difficulty in loading these awkward devices for transport, the requirement of a truck or trailer to haul them, the extra room needed to operate and maneuver these devices, their complexity, their high cost, their limitations in off-road use, the need to still carry a cooler if taking refreshments along, an additional rack or support means to secure that cooler for transit, and denied entry into events which prohibit motorized transit.

OBJECTS AND ADVANTAGES OF THE PRESENT INVENTION

The present invention was created to provide for adequate transportation at a weekend event, plus be easily transportable to those events.

The present invention is a compact, self-propelled, wheeled device, also referred to as a transport kart, or simply a kart. The present invention allows use of a common icechest or common cooler for the body element of this kart. The passenger simply sits atop the cooler during transport. The present invention allows for the power source used in propelling the kart, to be concealed within this body. This can give the transport kart the appearance of simply a common cooler, setting upon a set of wheels, disguising its true capability.

The present invention also allows for various configurations of the kart, to provide for transport of one or more passengers, and for the carrying of ones ice and refreshments. In addition to all this practical value, the present invention also provides for some outstanding and unexpected entertainment.

In the field of this invention, as best as currently known, no prior art has ever been invented that is designed to be as efficient, and as practical, at performing the task at hand, or as entertaining while performing that task.

As stated above, the present invention provides for adequate weekend transportation, and does so in a most efficient and practical manner. This is achieved through the use of this most unique body element, a common ice-chest or common cooler. Use of a common cooler allows one to take advantage of its many built-in features and benefits. To start with, the cooler type body element, also referred to as "container", is already suited for carrying ice and refreshments, and with the kart configured in this manner, eliminates the need to carry that separate cooler as required when using the prior art. It then further eliminates the need for those additional racks and support means to secure that cooler during transit. The size and shape of a particular cooler body can also be chosen to best meet ones needs, for example to allow the carrying of additional passengers. Use of a common cooler further provides for a multitude of functions that eliminates many of the components required by the prior art, ones which are required when transporting humans. This makes the transport kart simpler in design, more compact, and lower in cost. These benefits are explained in more detail below.

By allowing use of a common cooler, it allows for passengers to sit directly upon the body element itself, eliminating the need for any seating components or seating structure. This is possible because the present invention takes advantage of the stiff structural characteristics of the common cooler. The thick insulated type construction provides the strength needed to support such weight, with no additional seating elements required. This same construction also provides for the insulated environment needed to maintain cool storage of ones favorite refreshments. Additionally, the cooler body is built of durable material, which is also resistant to the outdoor elements. This eliminates the concern and cost of providing such protection.

Furthermore, because the transport kart must employ a power source to propel itself, protective guarding for the passengers must be considered. The inherent open design of a common cooler can provide for partial, if not full concealment of this power source. When one prepares a common cooler for concealment of a power source, which will be discussed later in more detail, the cooler body can shield its passengers from various rotating parts. This eliminates or reduces the need for protective shields or guards. Furthermore, the insulated body provides for significant noise reduction, an important consideration if used on a hunting trip, or in a populated area. Still yet, this built-in insulation also provides a thermal barrier between the passengers and any heat given off by a power source. This reduces or eliminates the need for heat shields or firewalls.

By disposing the power source in such a concealed manner, it also makes the transport kart smaller in physical size, enhancing its ability to fit into tight places, which makes this kart more maneuverable and usable in tight quarters and crowded events where others devices might not. The small size additionally makes for a kart which is lighter in weight, easy to pick up and move if needed. More importantly, because it is so compact and light in weight, the transport kart is now easy to load into the back of ones SUV, van, or pickup, finally allowing for most everyone to take such a device to a weekend event.

Still further, the transport kart might also gain entry into events where prior devices might not. This is made possible, partially thru this concealment of the power source, plus by allowing for the kart to be pulled by hand, described later in more detail. When being pulled by hand, with a concealed power source, the kart gives this appearance of simply a common cooler, setting upon a set of wheels. This prevents the conveyance of any intentions of motorized transit, as one certainly would convey if arriving on the prior art.

The present invention also allows use of readily available power sources. The invention allows usage and concealment of power sources large enough to carry more than one passenger, plus carry them across open road or off-road terrain. The invention also allows use of additional and extra power for providing more exciting entertainment, or for additional uses.

Additionally, selecting of a cooler body of sufficient size and shape, along with proper positioning of its mounting, allows for this body element to support its passengers in such a way as to prevent ones feet from contacting the ground while being transported. This function eliminates the need for running boards or for footrests, simplifying the transport kart even more.

All the above benefits now allow for a most efficient, compact, and economical device, resulting in a simple and reliable vehicle, easy to maintain, and lower in consumer cost.

Accordingly, several objects and advantages of this present invention include:

providing a compact device capable of providing adequate transportation at a weekend event, providing a compact device which allows for easy and simple transport to those events, providing a body element which is already suited to carry ice and refreshments, eliminating the need for a separate cooler, plus extra racks and support means to secure that cooler for transit, providing a body element that can be selected in size and shape to carry one passenger, or more, providing a body element which provides adequate seating for its passengers, eliminating the need for separate seating elements and support structure, providing a body element with built-in insulation, maintaining cool storage of ones ice and refreshments, providing a body element with built-in insulation, shielding its passengers from power source heat, and reducing or eliminating the need for heat shields or firewalls, providing a body element with built-in insulation, reducing the noise emitted to the surrounding environment, providing a body element made of durable material, plus resistant to outdoor elements, eliminating cost and concern of providing such protection, providing a body element configurable to conceal a power source, shielding its passengers from rotating parts, and reducing or eliminating the need for additional guarding, providing a body element configurable to conceal a power source, allowing for possible entry into events where the prior art would not, providing a transport kart which is compact and small in size, able to maneuver in tight quarters and crowds where prior art an not, providing a transport kart which is light in weight, providing for easy pick up and moving, and for easy loading into the back of ones vehicle to take to weekend events, providing for use of common and readily available power sources, ones large enough to easily convey its passengers across open road, or off-road terrain, providing for use of additional and extra power, to provide for more exciting entertainment, or for additional uses.

providing for use of a body element, sufficient in size and shape, to provide positioning of passengers up away from the ground, eliminating the need for footrests or running boards, and providing for a most efficient, compact, and economical device, resulting in a simple and reliable transport kart, easy to maintain, and lower in consumer cost.

Entertainment Value

In addition to all the above practical value, the transport kart also provides for some outstanding, and unexpected, entertainment. It does so first by providing for a most unique style of human transport. Upon casual observation, the layman might think the transport kart is again, just a common cooler sitting upon a set of wheels. However, when one sees someone hop upon the body of the kart, then go motoring across the landscape, one quickly becomes amazed and amused by it all. More astonishing yet, when that same someone hops back off the kart, opens up the lid, and proceeds to pull out an ice cold refreshment, the amazed onlooker now shakes their head in disbelief.

This type of reaction was witnessed repeatedly during testing of the kart within the public realm. The reaction and response was overwhelming. It was demonstrated to entertain all those who viewed it. The local media published an article about the invention, which was followed by letters received from individuals stating that it was "most out of control", "cool", "awesome", and stating "thanks for the laughs". The transport kart is truly a unique piece of entertainment value.

The cooler type body can also provide for a substantial amount of display area, across which one can reflect ones personality, or show off their special interests. One might display their favorite team colors, or favorite racecar number, or special paint scheme across the body, adding a personalized touch to ones vehicle, plus entertaining all those who view it. Commercial businesses have also shown interest in the kart. They have expressed interest in displaying their business names across the body, advertising such as a sponsor would on a racecar. The transport kart draws so much attention that it has attracted these businesses to consider its use as a unique, eye-catching, and entertaining form of advertising. The simple and clean appearance of a common cooler, immediately associated with fun and recreation, makes for a perfect advertising backdrop.

The common cooler is also being produced in a multitude of colors, including for example, olive drab. The manufacturers are creating these specialty coolers in response to the special needs of the consumer. The avid hunter for example wanted to maintain a lower profile while camping within their favorite hunting grounds, so requested olive drab. Additionally, special promotional type coolers are appearing, to help support a cause, or to promote a product, or a team. Some, or all of these specialty coolers may be suitable for use on the present invention, to better meet ones specific needs, or to just provide for some extra fun and entertainment while showing ones support.

In addition to all the above, the transport kart can also open up a whole new world of opportunity and enjoyment for persons who are less able. This kart can now transport them, along with their favorite food and beverage, to places they dared not, or could not go before. The design of this kart makes it easy to set oneself upon. There are no doors or obstructions to prevent one from simply sliding oneself over onto the body, and assuming the natural sitting position for transport.

In summary, the transport kart provides for some outstanding entertainment value, including the additional objects and advantages that follow:

providing for a most unique style of vehicle for human transport, providing for enjoyment and excitement while being transported, providing for an entertaining way to amuse others, providing for a fun means to display ones special interests, providing for a fun means to reflect ones personality, providing for an eye-catching means for businesses to advertise, providing for a fun and different means of showing ones support, and providing for a vehicle which can open up a whole new world of opportunity and enjoyment for those less able.

These, plus further objects and advantages will become more apparent when considered with the drawings and the ensuing descriptions.

SUMMARY OF THE INVENTION

The present invention provides for a most practical and entertaining means of recreational transportation. It is a compact transport kart, capable of transporting at least one human passenger. It comprises a body element comprising of, or substantially resembling, a common ice-chest or cooler. It also comprises at least two wheels, plus at least one power source which includes at least one rotational output. It includes a means to drivingly connect the rotational output of the power source to at least one of its wheels. It further includes a means to retain the body, wheels, and power source as one contiguous device, capable of supporting human passengers for transport, while rolling upon its wheels.

BRIEF DESCRIPTION OF DRAWINGS

FIG. 4 depicts a pull handle, for manual pulling of the kart, and a tow bar for towing of additional devices by the kart.

REFERENCE NUMERALS IN DRAWINGS

Figure 1:
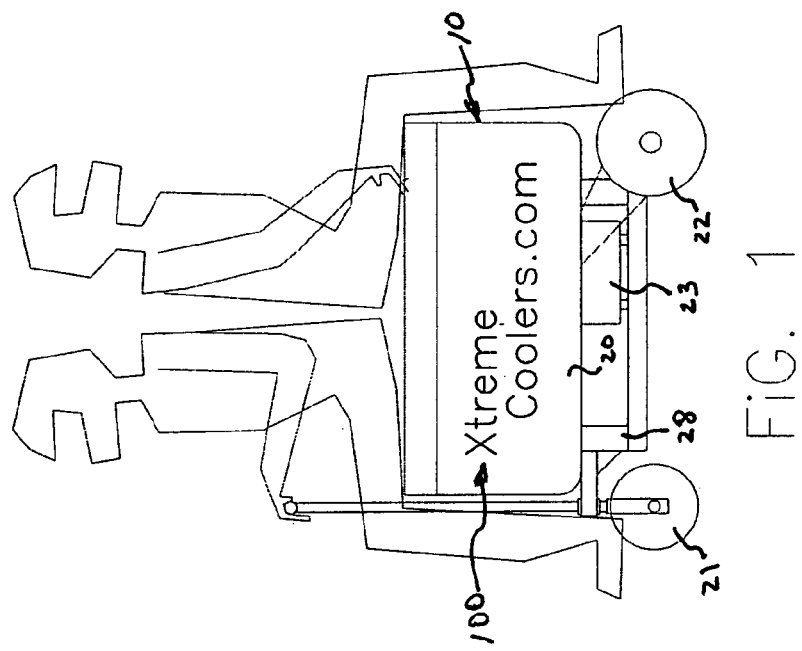
FIG. 1 depicts a side view of the transport kart, showing one possible configuration of the present invention.

10 transport kart
20 body element or container
21 front wheel
22 rear wheel
23 power source
24 rotational output
25 chain
26 sprocket
27 centrifugal clutch
28 frame or chassis
29 fastener
30 fastener
31 vent
32 opening
33 exhaust conduit
34 hole
35 support pad
40 stowage space
41 bulkhead
50 steering control means 60 speed control means
70 brake control means
80 pull handle
90 tow bar
100 business advertisement

DETAILED DESCRIPTION OF INVENTION

General Configuration

FIG. 1 depicts a side view of a transport kart 10, showing one possible configuration of the present invention. It shows a body element 20, a front wheel 21 and a rear wheel 22, plus a power source 23, shown partially concealed, and a frame or chassis 28 to retain the body, the wheels, and the power source as one integrated and contiguous device capable of rolling on these wheels. It is important to point out that there are other configurations of the present invention that might better meet ones specific needs or desires, but for the purpose of this disclosure, only a few examples will be depicted. Many other configurations are possible, which may include the use of three wheels, four wheels, or more, including use of various types and sizes of wheels for various types of terrain or use, or the use of a smaller body element, or larger body element, a concealed or non-concealed power source, lower or higher placement of the body element, etc. Components may vary in type, size, or in placement, based upon ones specific or desired needs. As stated previously and as illustrated in FIG. 2A, the present invention allows for use of a common cooler for the body element. An example of such a cooler might be the IGLOO brand cooler, of the 115 quart size. It must be noted however that the present invention allows use of any suitable cooler, or other embodiment substantially resembling one, for example as those depicted in each of the drawing figures.

Also shown in FIG. 1 is an example of a business advertisement 100, displayed across body element 20. The simple and clean appearance of a common cooler makes for a perfect backdrop for a business advertisement.

Construction

Figure 2:
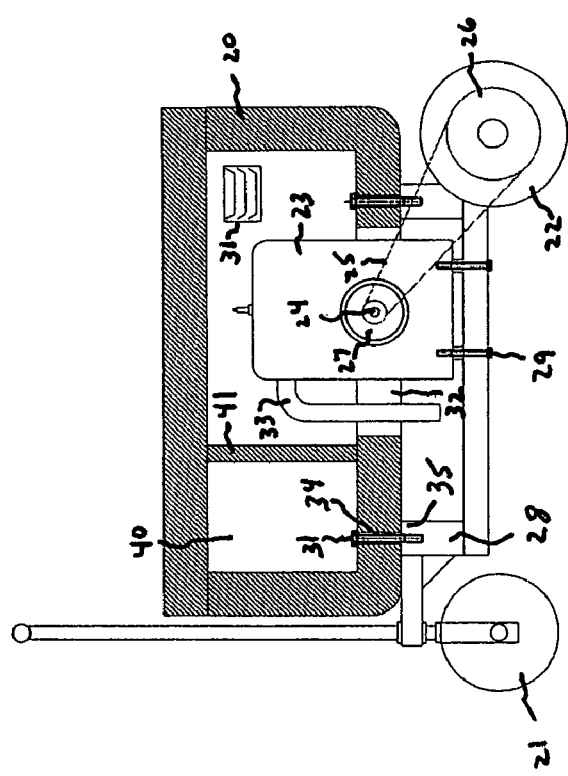
FIG. 2 depicts the embodiment of FIG. 1, but showing a partial cut-away view of the body element.
Figure 2A:
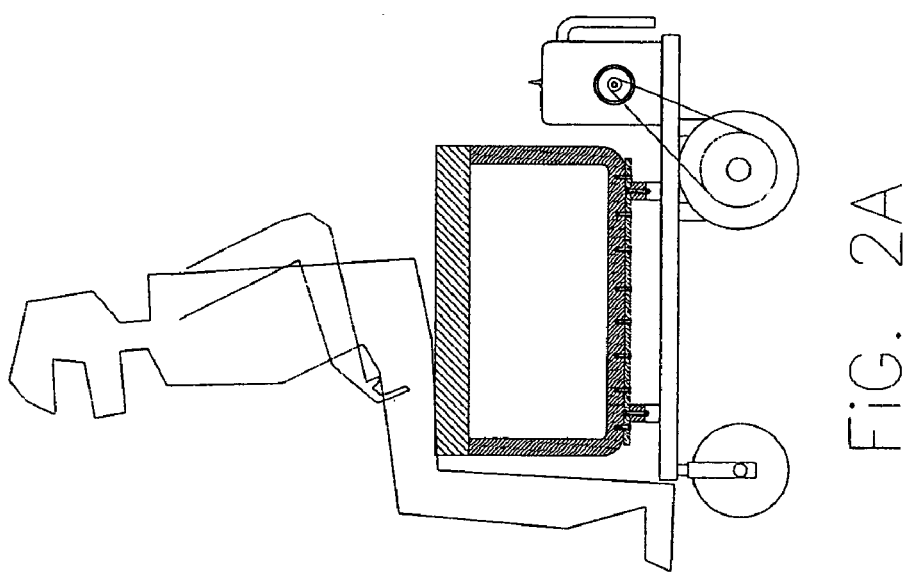
FIG. 2A depicts an alternative configuration of the present invention.

FIG. 2 depicts the embodiment shown in FIG. 1, but showing a side cut-away view of body element 20, to better depict this one configuration of the present invention. It better depicts use of chassis 28 to support power source 23 along with wheels 21 and 22 mounted for rotation. Use of a chassis type element is a well-known and common means for integrating the components of a wheeled device into a single contiguous unit. Other methods of assembly such as the use of the body element itself to support the wheels, or to support the power source, could also be employed. This might eliminate the need for a chassis element altogether. This, or even other means for assembly are acceptable.

Figure 2B:
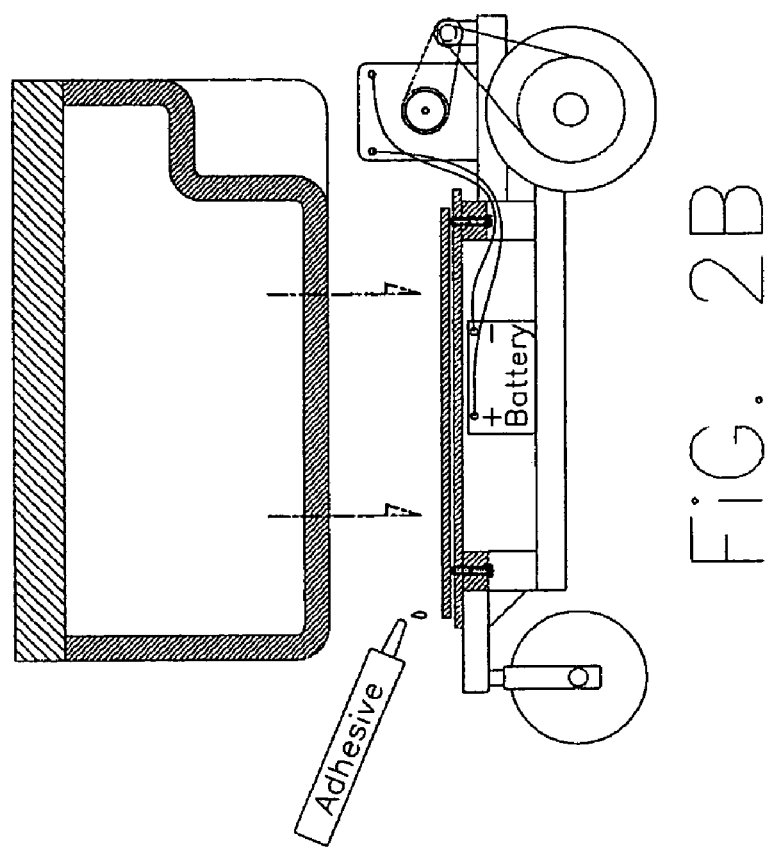
FIG. 2B depicts a second example of an alternative configuration of the present invention.

FIG. 2 further depicts power source 23 mounted in such a manner that disposes the power source partially within body element 20. This configuration might be chosen to provide for a most compact design. One may also choose to configure their vehicle with additional power, to not only propel the weight of the vehicle itself, plus its human passenger, but to also carry ones iced down food and drink, plus possibly additional passengers, plus maybe tow another wagon or cart behind. A power source required to perform such tasks might be a 5 horsepower go-kart type engine. To maintain a most compact design however, with all the associated benefits of being compact, one should consider disposing this power source at least partially within the body element of the kart. Altering the configuration of a suitable cooler can provide for this. As depicted in FIG. 2, a section of cooler floor can be removed, providing for a opening 32, which allows positioning of the power source partially within body element 20. This configuration now allows the present invention to still maintain its clean and simple outward appearance of the common everyday cooler, yet employ a power source capable of performing the desired tasks. An alternative to removing a section of floor from the bottom of a common cooler, might be to manufacture a body element substantially resembling the common cooler, but manufactured with the opening already incorporated into its construction. One can then still retain that all-important outward appearance of a common everyday cooler. This type of body element is referred to as, substantially resembling a common cooler. Depending on ones specific desires, one can choose to install an opening as illustrated in FIG. 2, or not as FIG. 2A illustrates, or to install an opening in the back as depicted in FIG. 2B, or in some other desired area of the body. This is allowed as well, to best meet ones specific needs.

FIG. 2 therefore shows power source 23 attached to chassis 28, using such common threaded fastening devices as a fastener 29. The power source however may also be positioned in other locations, or attached to other elements, using other fastening means. Furthermore, many types of power sources are available, which may also be suitable for use in this transport kart. As depicted in FIG. 2B, examples might include, but are not limited to, electric motors such as those used in golf-carts, or two-stroke internal combustion engines such as those used on small motorcycles or scooters. It is left up to the individual to choose a power source that best meets their needs.

Further in reference to FIG. 2, depending upon the type of power source used, one may require additional insulation within the body (not shown), or some means of ventilation, such as a vent 31. A vent means can allow for unwanted heat to escape from the region about the power source when one disposes a power source within the body element. Opening 32, as shown located in the bottom of the cooler body, can provide for an entrance for cool air to enter, as heated air rises and escapes through the ventilation means. Furthermore, if using an internal combustion engine where fresh air is required to promote the combustion process, an opening can provide for this as well. Still yet, with an internal combustion process, hot exhaust gases are generated, requiring a safe point of exit for these hot gases. The opening could also provide for this safe point of exit. One could simply direct the exhaust flow through the opening as depicted, using a exhaust conduit 33 to channel those hot gases. Additionally, one could reduce the heat radiated from a exhaust conduit by wrapping the conduit with readily available exhaust heat tape (not shown) to reduce the heat generated within the area.

Propelling of this transport kart is accomplished by incorporating a means to drivingly connect a rotational output of a power source, to at least one wheel. Many such means are known, and are in common use today. FIG. 2 depicts one such means, comprising a centrifugal clutch 27, mounted on a rotational output 24 of power source 23, with a chain 25 rotatively connecting centrifugal clutch 27 to a sprocket 26, depicted mounted on rear wheel 22. This is only one common method of drivingly connecting a rotational output from a power source to at least one wheel for the propelling of a wheeled vehicle. Various other methods, plus methods for providing 2-wheel drive, 4-wheel drive, etc, could also be used. Intermediate devices can be inserted into the drive system as well. Examples might be a multi-shift transmission, or a variable speed belt drive, or multiple chains, sprockets and shaft combinations as depicted in FIG. 2B, or others (which have not been depicted for the purpose of this disclosure). These are all means commonly employed in such popular recreational vehicles as go-karts, mini-bikes, snowmobiles, 4-wheelers, golf-carts, etc, with components readily available on the commercial market. It should also be noted that this is true for all the common or well-known types of methods or means mentioned throughout these discussions.

Construction Continued

Also depicted in FIG. 2. is a bulkhead element 41, which can be used when it is desired to segment the interior of body element 20. This might be done when one wishes to carry ice and refreshments within the transport kart body, but disposed the power source within the body element. Bulkhead 41 could be installed to create a stowage space 40, providing an isolated containment space for ones ice and refreshments, plus providing for insulation of that space from heat given off by the power source.

Additionally in FIG. 2, is depicted a possible attachment method for retaining of body element 20 to chassis 28, using common threaded fasteners such as a fastener 30. A series of these threaded fasteners could be placed through holes, such as a hole 34, drilled proximate to the bottom perimeter of body element 20, and threaded into support pads, such as a support pad 35, located strategically around chassis 28. Other attachment methods may again be acceptable for retention and desired positioning of the body element as FIG. 2A and FIG. 2B begin to illustrate. These would be acceptable providing one skilled in the art gives adequate consideration to positioning and proper distribution of the loads imposed upon the body over a sufficient amount of support pad area, thereby preventing unacceptable deformation of the body element under those loads.

Figure 3:
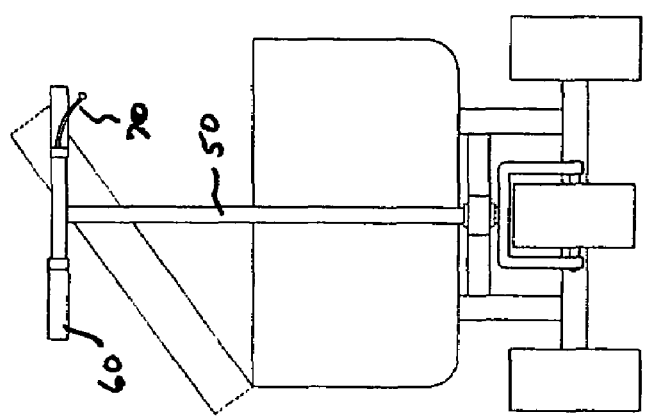
FIG. 3 depicts a front view of the transport kart, showing possible steering, speed, and brake control means.

FIG. 3 depicts a front view of the transport kart. It depicts an example of a steering control means 50, such that the passenger can pivot the front wheel, or wheels, about some substantially vertical axis, or axes, allowing directional control of the transport kart as it is being propelled on its wheels. The steering control input means might comprise a tee handle, a wheel, or any other suitable shape for one to apply manual input to steer the kart. There are many known methods and many commercially available components available, to provide for steering of wheeled vehicles. Any of these, or one of a different more preferred design, may again be applied to this invention.

FIG. 3 also depicts a speed control means 60, for providing speed control of the transport kart. Depicted control means 60 represents a twist grip type cable control, commonly used for governing the rotational output speed of an internal combustion engine, such as for example, one used on a mini-bike. Simple twisting of the handgrip in turn pulls a cable (not shown), opening a throttle linkage on the engine, increasing engine output speed, and in turn vehicle speed. This is just one of many known and common means for speed control. Various other methods may be preferred depending upon the power source selected. For example, if an electric motor was selected, one might choose a control method that would operate a variable speed transmission, or one might select an electrical means that varies motor speed directly. Again, there are many common and well-known means for controlling the output speeds of power sources, or of intermediate devices such as transmissions, or others. Any suitable method is acceptable.

Depicted also in FIG. 3. is a brake control means 70. This depicts a common hand lever type means, whereby pulling of the hand lever pulls on a cable (not shown), which in turn might squeeze a set of friction pads against a disk or drum, which can be mounted on a wheel, or on an axle, or intermediate shaft, rotatively connected to a wheel, in turn braking the vehicle. Once again, there are many types of braking means available for one to choose from, or one can use one of their own design.

Many passenger input controls are commercially available, many being used on such vehicles as go-karts, mini-bikes, snowmobiles, 4-wheelers, golfcarts, etc, which are acceptable devices for this invention.

Additional Features

FIG. 4 depicts a pull handle 80, shown comprising the upper section of steering control means 50 pivoted forward, for possible pulling of the transport kart by hand. This, or another pull handle means, can be a great advantage when attending an event where motorized transit is prohibited. This type of feature allows one to still attend the event, simply by walking and pulling ones kart by hand, preventing one from conveying any motorized transit intentions.

FIG. 4 also depicts a tow bar 90, which could comprise of simply an extension of chassis 28, or some other means, to provide for a towing connection to allow towing of additional devices, or for preventing one from rotating the kart beyond a comfortable angle of inclination when popping a wheelie, as will be explained below. The tow bar could be used to tow a wagon or cart behind the transport kart, to allow transporting of additional passengers, or additional cargo. One could use this feature for a multitude of tasks, towing any number of additional items. It would be left up to ones imagination as to the additional value one could derive from the invention.

Operation

Referring now to FIG. 1, FIG. 2, and FIG. 3, to operate this transport kart, configured as one described above, one might first load their transport kart 10 (FIG. 1) with ones favorite ice and refreshments. One would do so by simply opening the lid of the cooler type body 20 (FIG. 1), then load their ice and refreshments into stowage space 40 (FIG. 2). Once loaded, one would prepare the transport kart power source 23 (FIG. 2) for powered operation. Once complete, and the lid re-closed, one could then sit upon the forward end of body with their legs bent over that forward end. They could then engage the power source through speed control means 60 (FIG. 3), to accelerate the transport kart to a desired speed. One would then steer the direction of motion of their transport kart through use of steering control means 50 (FIG. 3), directing them towards their desired destination. Upon arrival at that destination, one could then apply braking to their kart, through brake control means 70 (FIG. 3), bringing one to a smooth stop. One could then dismount the kart, and if desired, open the lid of their cooler type body, and select their refreshment of choice.

One can additionally, further enhance the excitement and entertainment value of ones transport kart, by providing for sufficient speed reduction between the rotational output of the power source, and the driving wheel, or wheels of the kart. This can be achieved through use of multiple chains and sprockets (again, none of which are shown). One would then increase the torque available for vehicle acceleration by doing so. By doing this, one might accelerate the vehicle fast enough to cause the center of mass to pivot about the rear wheel axis of rotation, resulting in the lifting of the front wheel, or wheels, off of the ground. This is commonly referred to as "popping a wheelie", which has repeatedly been demonstrated to bring out cheers and laughter from the surrounding crowd, adding to ones entertainment value, and to ones personal driving excitement.

Accordingly, some further benefits and advantages of the present invention include:

allowing use of readily available commercial components,
allowing use of various types of power sources,
allowing use of various type drive means, and intermediate devices,
providing use of a bulkhead element, to allow isolated and insulated containment of ones favorite refreshments, while still allowing for concealment of the power source within the body element,
providing a pull handle to allow manual pulling of ones kart, allowing possible entry into events where motorized transit is prohibited,
providing a method to increase vehicle acceleration, to provide additional wheelie popping excitement, and entertainment.

CONCLUSION

The transport kart is a simple device. It can be assembled using a variety of well-known and readily available parts, such as those commonly used on go-karts, mini-bikes, snowmobiles, 4-wheelers, golf-carts, etc. It provides for a most practical means of transportation, providing transport for at least one human passenger, configurable with power enough to perform additional tasks, or to provide additional entertainment. The transport kart has been repeatedly demonstrated to amaze and amuse all who view it. It draws so much attention that businesses are considering its use in advertising. It makes for a most compact, and lightweight device, easily loaded into the back of ones vehicle to take to their favorite weekend events. No prior art has such built-in features and advantages. The transport kart can conceal its power source to maintain a simple and clean appearance of the common and everyday cooler. It can provide a drive system capable of taking off popping wheelies, transporting one in a fashion like no other device before it. No prior art is as unique, or can provide for so much enjoyment and entertainment while performing the task at hand. Additionally, no other device can open up a whole new world of enjoyment to those less able.

RAMIFICATIONS AND SCOPE

Although, the description of the transport kart above contains much specificity, these should not be construed as to limit the scope of the present invention, but as merely providing illustrations of some of the preferred embodiments.

Thus, the scope of the present invention should be determined by the appended claims and their legal equivalents, rather than the examples given.

What is claimed is:

1. A transport kart comprising:
a container which is substantially representative of the common ice-chest or common cooler, and
a kit for converting said cooler into a transport kart capable of transporting at least one human passenger, the kit comprising:
  a) at least one frame for supporting and retaining said container,
  b) at least two wheels, each wheel being rotatably mounted on at least one said frame, and
  c) at least one power source fixedly retained to at least one frame, and including at least one rotational output coupled to at least one said wheel to provide propulsion for said transport kart,
such that when assembled, the at least one frame, the at least one power source, and the wheels comprise an integrated device capable of rolling upon said wheels.

2. The transport kart of claim 1, further including a steering control coupled to at least one wheel for directional control of said transport kart.

3. The transport kart of claim 1, further including a speed control coupled to said power source, for controlling a speed of said transport kart.

4. The transport kart of claim 1, further including a brake coupled to at least one wheel for braking said transport kart.

5. The transport kart of claim 1, further including a pull handle coupled to a front of said kart for pulling or towing of said transport kart.

6. The transport kart of claim 1, further including a tow bar coupled to a rear of said kart, for towing an additional wagon, cart, or other device by said transport kart.

7. A transport kart capable of transporting at least one human passenger, comprising:
  a) a container representative of a common ice-chest or common cooler and of sufficient size and structure to provide a primary means of support for said human passenger,
  b) a chassis having a forward end and a rearward end for supporting the container,
  c) at least one front wheel rotatably mounted to the forward end of the chassis,
  d) at least one rear wheel rotatable mounted to the rearward end of the chassis;
  e) at least one power source fixedly retained to the chassis, including at least one rotational output separate from the chassis and connected to at least one of the front wheel or the rear wheel for propulsion of the kart;
    such that said chassis supports the container upon the at least one front wheel and the at least one rear wheel separately from the rotational output of the power source.

8. The transport kart of claim 7, further including a steering control coupled to said at least one front wheel for directional control of said transport kart.

9. The transport kart of claim 7, further including a speed control coupled to said power source, for controlling a speed of said transport kart.

10. The transport kart of claim 7, further including a brake coupled to at least one wheel for braking said transport kart.

11. The transport kart of claim 7, further including a pull handle coupled to a front of said kart for pulling or towing of said transport kart.

12. The transport kart of claim 7, further including a tow bar coupled to a rear of said kart, for towing an additional wagon, cart, or other device by said transport kart.

13. A transport kart capable of transporting at least one human passenger, comprising:
  a) a container representative of a common ice-chest or common cooler, of sufficient size and structure to provide a primary means of support for said human passenger,
  b) at least one frame supporting the container,
  c) at least two wheels, each wheel rotatably mounted to said at least one frame, and
  d) at least one power source fixedly retained to the at least one frame and including at least one rotational output separate from said frame and coupled to at least one wheel to provide propulsion for said transport kart,
    such that the at least one frame supports the container separately from the rotational output, providing support to the container, the at least one power source, and the rotatably attached wheels, forming an integrated device capable of rolling upon said wheels.

14. The transport kart of claim 13, wherein said container includes a stowage space.

15. The transport kart of claim 13 wherein said power source is concealed at least partially within said container.

16. The transport kart of claim 13, further including a steering control coupled to at least one wheel for directional control of said transport kart.

17. The transport kart of claim 13, further including a speed control coupled to said power source, for controlling a speed of said transport kart.

18. The transport kart of claim 13, further including a brake coupled to at least one wheel for braking said transport kart.

* * * * *